(12) United States Patent
Lin et al.

(10) Patent No.: US 12,743,130 B2
(45) Date of Patent: Sep. 22, 2026

(54) FLEXIBLE DISPLAY DEVICE

(71) Applicant: E Ink Holdings Inc., Hsinchu (TW)

(72) Inventors: Yi-Sheng Lin, Hsinchu (TW); Chia-Chun Yeh, Hsinchu (TW); Chen Chu Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/951,677

(22) Filed: Nov. 19, 2024

(65) Prior Publication Data

US 2025/0231589 A1 Jul. 17, 2025

(30) Foreign Application Priority Data

Jan. 15, 2024 (TW) ................................ 113101508

(51) Int. Cl.
*G06F 1/16* (2006.01)

(52) U.S. Cl.
CPC .................................. *G06F 1/1652* (2013.01)

(58) Field of Classification Search
CPC ..................................................... G06F 1/1652
See application file for complete search history.

(56) References Cited

U.S. PATENT DOCUMENTS 11,314,285 B2 4/2022 Feng
11,602,062 B2 3/2023 Wittenberg et al.
2017/0212607 A1* 7/2017 Yoon ...................... G06F 3/147
2017/0367198 A1* 12/2017 Park ...................... G06F 1/1652
2021/0098723 A1* 4/2021 Shin ........................ G06F 3/041
2022/0240400 A1* 7/2022 Zhou .................... H05K 5/0217
2022/0291718 A1* 9/2022 Park .................... H04M 1/0268
2022/0322547 A1* 10/2022 Wang .................... G06F 1/1652
2022/0418123 A1* 12/2022 Liu ...................... G06F 1/1624
2024/0098913 A1* 3/2024 Wittenberg .......... H10K 77/111

FOREIGN PATENT DOCUMENTS

CN 114578906 A * 6/2022 .......... G06F 3/0412
CN 118934823 A * 11/2024 ............. F16F 15/02
EP 4043995 8/2022
TW 201810213 3/2018
TW 202006684 A * 2/2020
TW 202217421 5/2022

* cited by examiner

*Primary Examiner* — Temesghen Ghebretinsae
*Assistant Examiner* — Karin Kiyabu
(74) *Attorney, Agent, or Firm* — JCIPRNET

(57) ABSTRACT

A display includes a display size adjustment module and a flexible display module. The display size adjustment module includes a first element and a second element. The first element includes multiple first ribs arranged at intervals. The second element includes multiple second ribs arranged at intervals and slidably engaged with the first ribs. A size of the display increases as the second element slides away from the first element and decreases as the second element slides toward the first element. The flexible display module is disposed on the display size adjustment module and is bent to a back side of the display size adjustment module. The flexible display module includes a flexible display panel and a flexible support member supporting the flexible display panel. The flexible support member is connected to the second element through at least one of magnetic attraction, electrostatic attraction, or a buckle.

7 Claims, 14 Drawing Sheets

FLEXIBLE DISPLAY DEVICE

CROSS-REFERENCE TO RELATED APPLICATION

This application claims the priority benefit of Taiwan application serial no. 113101508, filed on Jan. 15, 2024. The entirety of the above-mentioned patent application is hereby incorporated by reference herein and made a part of this specification.

BACKGROUND

Technical Field

The disclosure relates to an electronic device, and in particular to a display.

Description of Related Art

The flexible display needs to have a certain thickness due to impact resistance considerations or the addition of a functional layer (for example, a touch layer or a front light layer), and the rigidity of the display is highly related to the thickness and the material properties of the display. The display with high rigidity requires greater force to be rolled up and is prone to warping and is not easy to flatten, which reduces the user experience. The existing technology flattens the display by adopting mechanical components, but when the display is stressed for a long time, regional functional abnormalities are prone to occur, and the spring that provides the pulling force is prone to fatigue and permanent deformation.

SUMMARY

The disclosure provides a display, which helps to reduce a pulling force required to flatten a display.

A display of the disclosure includes a display size adjustment module and a flexible display module. The display size adjustment module includes a first element and a second element. The first element includes multiple first ribs arranged at intervals. The second element includes multiple second ribs arranged at intervals and slidably engaged with the first ribs. A size of the display increases as the second element slides away from the first element and decreases as the second element slides toward the first element. The flexible display module is disposed on the display size adjustment module and bent to a back side of the display size adjustment module. The flexible display module includes a flexible display panel and a flexible support member supporting the flexible display panel. The flexible support member is connected to the second element through at least one of magnetic attraction, electrostatic attraction, or a buckle.

In an embodiment of the disclosure, multiple side walls of the second ribs include multiple second grooves, and the second element further includes multiple second pop-up mechanisms embedded in the second grooves. During a process of the second element sliding away from the first element, the second grooves are exposed by the first ribs, and the second pop-up mechanisms eject from the second grooves. During a process of the second element sliding toward the first element, the second pop-up mechanisms are squeezed by the first ribs and return to the second grooves. The second pop-up mechanisms are magnetic, and a material of the flexible support member includes a paramagnetic material or a ferromagnetic material.

In an embodiment of the disclosure, two adjacent second pop-up mechanisms corresponding to a same second rib are disposed in a magnetically homogeneous manner, and two adjacent second pop-up mechanisms corresponding to two adjacent second ribs are disposed in a magnetically heterogeneous manner.

In an embodiment of the disclosure, the second element further includes multiple second rotating shafts. The second pop-up mechanisms are respectively disposed corresponding to the second rotating shafts and are fixed in the second grooves through the second rotating shafts.

In an embodiment of the disclosure, the second element further includes multiple second springs. The second pop-up mechanisms are respectively disposed corresponding to the second springs and eject from the second grooves through the second springs.

In an embodiment of the disclosure, multiple side walls of the first ribs include multiple first grooves. The first element also includes multiple first pop-up mechanisms embedded in the first grooves. During a process of the second element sliding away from the first element, the first grooves are exposed by the second ribs, and the first pop-up mechanisms eject from the first grooves. During a process of the second element sliding toward the first element, the first pop-up mechanisms are squeezed by the second ribs and return to the first grooves.

In an embodiment of the disclosure, the first element further includes multiple first rotating shafts. The first pop-up mechanisms are respectively disposed corresponding to the first rotating shafts and are fixed in the first grooves through the first rotating shafts.

In an embodiment of the disclosure, the first element further includes multiple first springs. The first pop-up mechanisms are respectively disposed corresponding to the first springs and eject from the first grooves through the first springs.

In an embodiment of the disclosure, two adjacent first pop-up mechanisms corresponding to two adjacent first ribs have an interlocking buckle design.

In an embodiment of the disclosure, at least one of the first ribs and an adjacent second rib have an interlocking buckle design.

In an embodiment of the disclosure, the flexible display module further includes multiple buckles. The buckles are disposed on a surface of the flexible support member facing the display size adjustment module. During a process of the second element sliding away from the first element, the second ribs slide away from the first ribs and are engaged with the buckles.

In an embodiment of the disclosure, a side wall of each of the buckles has a trench, and the trench is buckled to an upper edge of an adjacent second rib.

In an embodiment of the disclosure, a thickness of the buckle is less than a thickness of the first rib.

In an embodiment of the disclosure, the flexible support member includes a rigid portion and a sliding portion connected to the rigid portion. The sliding portion includes multiple openings. The openings are staggered in a first direction and aligned in a second direction to form multiple H-shaped connecting portions. The buckles are disposed adjacent to multiple corners of the H-shaped connecting portions.

In an embodiment of the disclosure, the buckles are strip buckles extending along a first direction, and the buckles are formed on the surface of the flexible support member facing the display size adjustment module through welding or pasting.

In an embodiment of the disclosure, a surface of each of the buckles facing the display size adjustment module has a repeating inverted trapezoid structure. The display also includes a wheel. The wheel is disposed on a side of the second element away from the first element, and the flexible display module surrounds the wheel and is bent to the back side of the display size adjustment module. The wheel has multiple annular grooves corresponding to the buckles.

In an embodiment of the disclosure, the flexible display module further includes multiple hanging buckles. The hanging buckles are disposed on a surface of the flexible support member facing the display size adjustment module. Multiple side walls of the second ribs include multiple second grooves, and the second element also includes multiple second pop-up mechanisms embedded in the second grooves. During a process of the second element sliding away from the first element, the second grooves are exposed by the first ribs, and the second pop-up mechanisms eject from the second grooves and form a buckled state with the hanging buckles. During a process of the second element sliding toward the first element, the second pop-up mechanisms are squeezed by the first ribs and return to the second grooves. As the flexible display module is bent to the back side of the display size adjustment module, the hanging buckles are flatly attached to the surface of the flexible support member facing the display size adjustment module.

In an embodiment of the disclosure, the flexible display module further includes multiple loop buckles. The loop buckles are disposed on a surface of the flexible support member facing the display size adjustment module and are adjacent to an end of the flexible support member away from the first element. The second element also includes multiple hook buckles. The hook buckles are embedded in the second ribs and are adjacent to multiple ends of the second ribs away from the first element. During a process of the second element sliding away from the first element, the hook buckles form a buckled state with the loop buckles.

In an embodiment of the disclosure, each of the hook buckles has a roller and multiple hooks located on the roller. During a process of the second element sliding away from or sliding toward the first element, the roller rotates.

In an embodiment of the disclosure, materials of the flexible support member and the second element include conductive materials.

In order for the features and advantages of the disclosure to be more comprehensible, the following specific embodiments are described in detail in conjunction with the drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
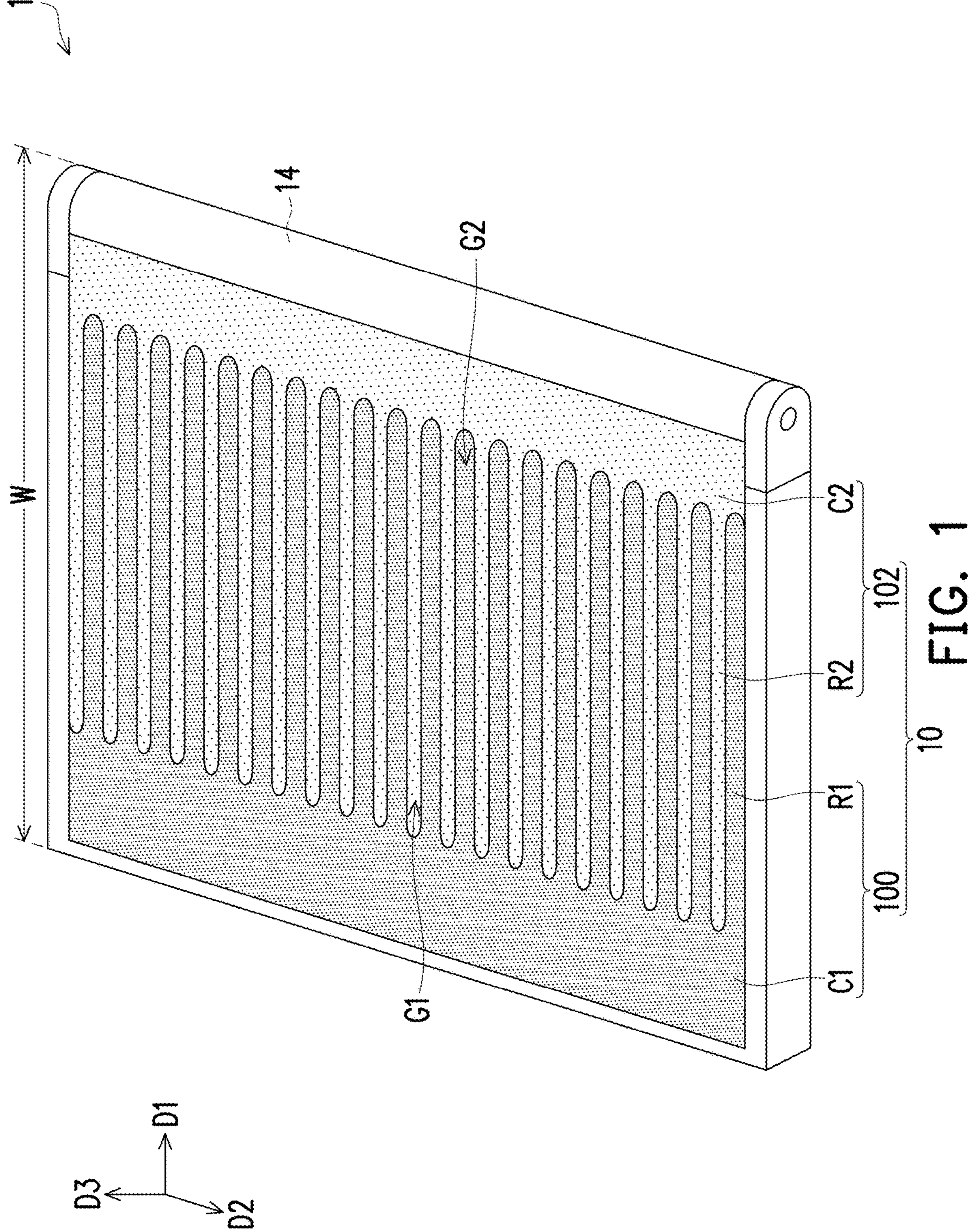
FIG. 1 and FIG. 2 are respectively three-dimensional schematic views of a display in a stowed state and an unfolded state according to a first embodiment of the disclosure.

Directional terms such as "upper", "lower", "front", "rear", "left", and "right" mentioned in the disclosure are only directions with reference to the drawings. Therefore, the used directional terms are used to illustrate, but not to limit, the disclosure.

The drawings illustrate the general features of methods, structures, or materials used in particular embodiments. However, the drawings should not be interpreted as defining or limiting the scope or the nature encompassed by the embodiments. For example, relative sizes, thicknesses, and positions of layers, regions, or structures may be reduced or enlarged for clarity.

In the drawings, the same or similar elements adopt the same or similar reference numerals, and redundant description is omitted in the specification. In addition, features in different embodiments may be combined with each other without conflict, and simple equivalent changes and modifications made in accordance with the specification or the claims are still within the scope of the disclosure.

Terms such as "first" and "second" mentioned in the specification or the claims are only used to name different elements or to distinguish different embodiments or scopes and are not used to set an upper limit or a lower limit on the number of elements, nor to limit the manufacturing order or the configuration order of the elements. In addition, an element/a film layer being disposed on (or above) another element/film layer may include a case where the element/film layer is directly disposed on (or above) another element/film layer and the two elements/film layers directly contact; and a case where the element/film layer is indirectly disposed on (or above) another element/film layer and there is one or more elements/film layers between the two elements/film layers.

Figure 2:
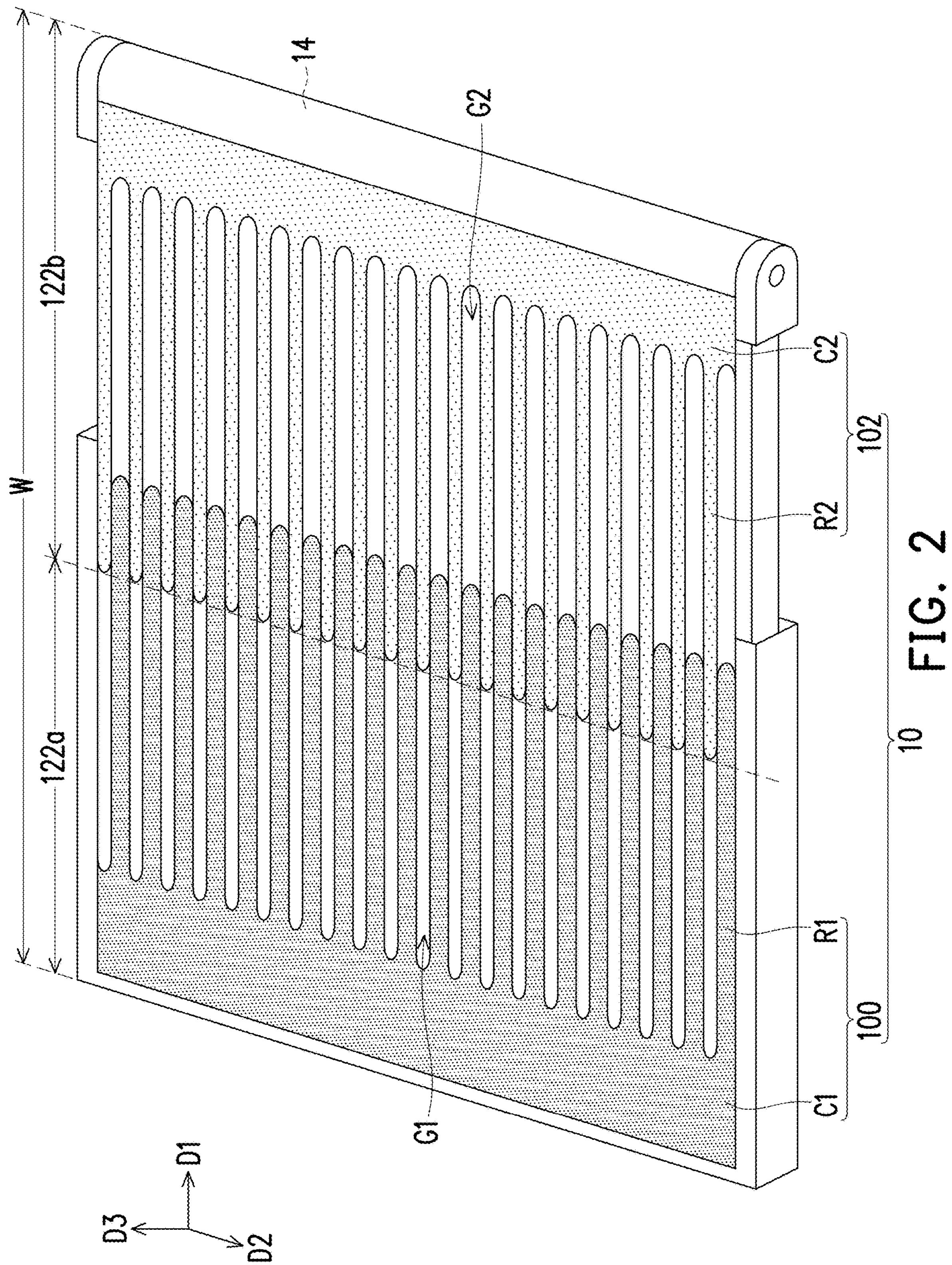
Figure 3:
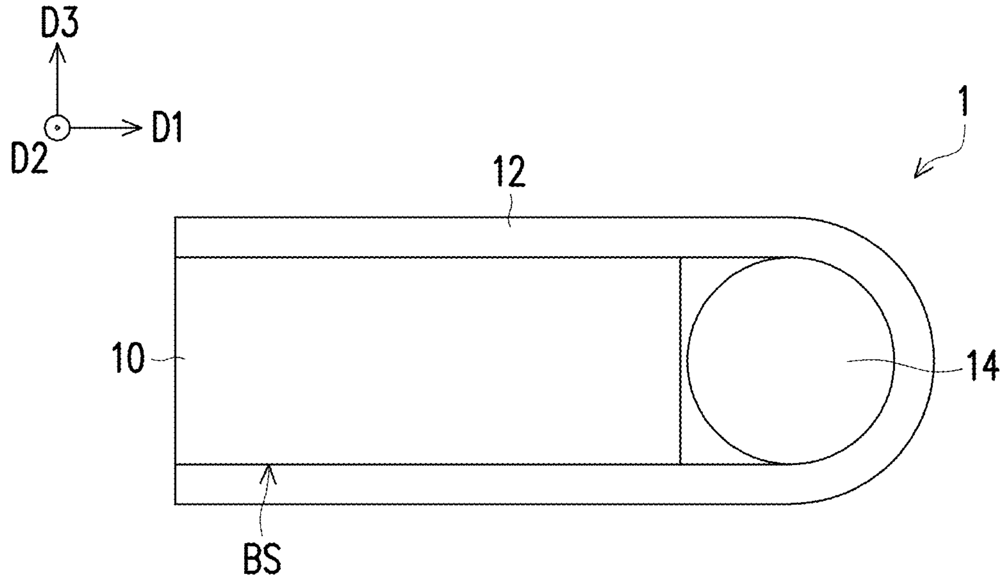
FIG. 3 is a partial cross-sectional schematic view of the display of FIG. 1.
Figure 4:
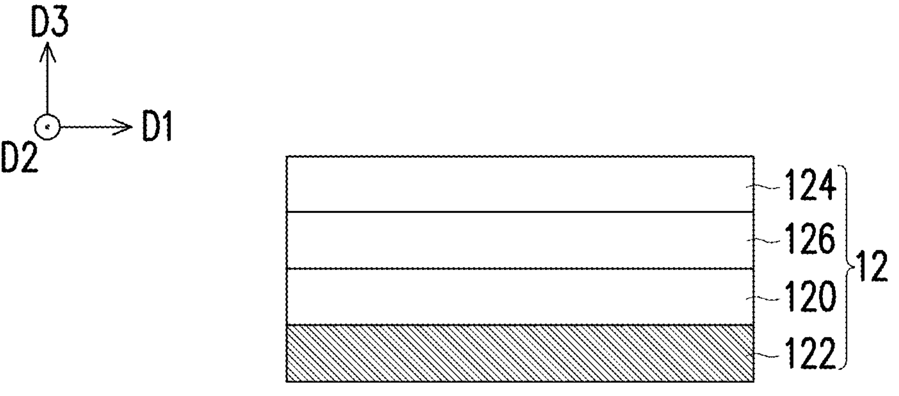
FIG. 4 is a partial cross-sectional schematic view of a flexible display module of FIG. 3.
Figure 5:
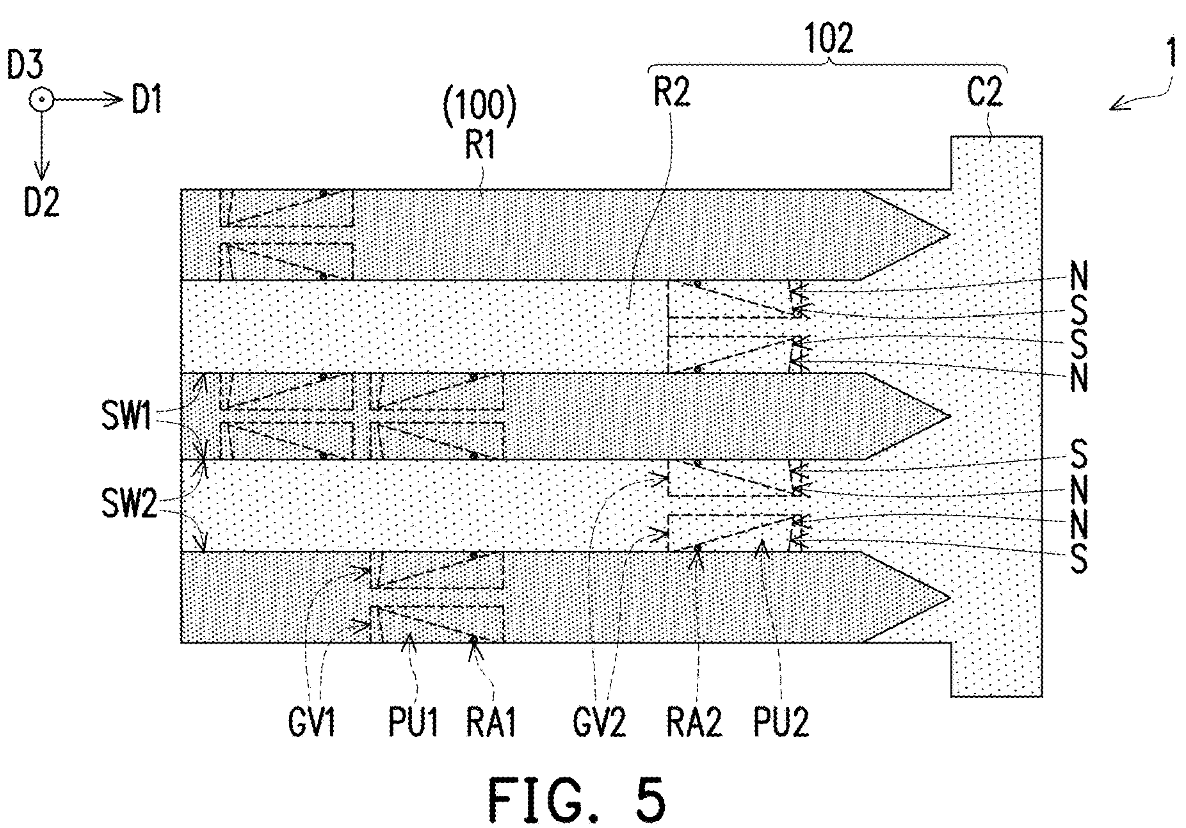
FIG. 5 and FIG. 6 are respectively partial top schematic views of the display in the stowed state and the unfolded state according to the first embodiment of the disclosure.
Figure 6:
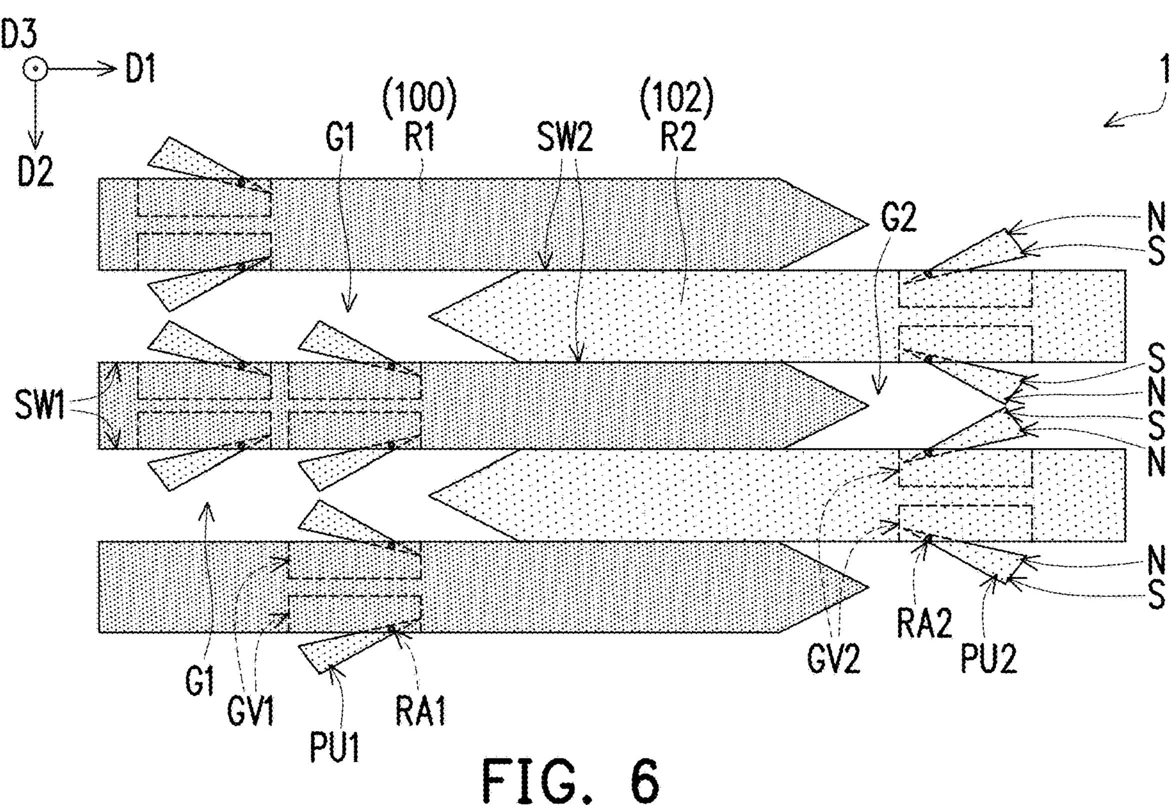

FIG. 1 and FIG. 2 are respectively three-dimensional schematic views of a display in a stowed state and an unfolded state according to a first embodiment of the disclosure. FIG. 3 is a partial cross-sectional schematic view of the display of FIG. 1. FIG. 4 is a partial cross-sectional schematic view of a flexible display module of FIG. 3. FIG. 5 and FIG. 6 are respectively partial top schematic views of the display in the stowed state and the unfolded state according to the first embodiment of the disclosure.

A display 1 of the first embodiment of the disclosure is, for example, a slidable display, which may include a display size adjustment module 10 and a flexible display module 12 disposed on the display size adjustment module 10. In FIG. 1, FIG. 2, FIG. 5, and FIG. 6, in order to clearly show the relative configuration relationship of multiple elements in the display size adjustment module 10 located below the flexible display module 12, the flexible display module 12 is omitted.

Please refer to FIG. 1 and FIG. 2 first. The display size adjustment module 10 is configured to adjust the size of the display 1. For example, a width W of the display 1 in a first direction D1 may be enlarged or reduced through the display size adjustment module 10, but not limited thereto.

Specifically, the display size adjustment module 10 may include a first element 100 and a second element 102. The first element 100 may include multiple first ribs R1 arranged at intervals. The first ribs R1, for example, extend in the first direction D1 and are arranged in a second direction D2. The first direction D1 and the second direction D2 are both perpendicular to a thickness direction of the display 1 (for example, a third direction D3). In addition, the first direction D1 and the second direction D2 intersect each other, and are, for example, perpendicular to each other, but not limited thereto. In some embodiments, as shown in the drawings, the first element 100 may also include a first connector C1. The first connector C1, for example, extends in the second direction D2 and is connected to multiple ends of the first ribs R1 away from the second element 102.

The second element 102 may include multiple second ribs R2 arranged at intervals and slidably engaged with the first ribs R1. The second ribs R2, for example, extend in the first direction D1 and are arranged in the second direction D2. In addition, the first ribs R1 and the second ribs R2 are, for example, alternately arranged in the second direction D2. In some embodiments, as shown in the drawings, the second element 102 may also include a second connector C2. The second connector C2, for example, extends in the second direction D2 and is connected to multiple ends of the second ribs R2 away from the first element 100. In other words, the first connector C1 and the second connector C2 are respectively located on two opposite sides of the first ribs R1 and the second ribs R2.

In some embodiments, the first element 100 is, for example, a fixed member, and the second element 102 is, for example, a movable member. Through moving the second element 102 relative to the first element 100 (such as changing a distance between the first connector C1 and the second connector C2), the size of the display 1 may be adjusted (such as enlarging or reducing the width W of the display 1 in the first direction D1). Specifically, as shown in FIG. 2, the size of the display 1 may increase as the second element 102 slides away from the first element 100, and as shown in FIG. 1, the size of the display 1 may decrease as the second element 102 slides toward the first element 100.

FIG. 1 schematically illustrates the stowed state (folded state) of the display 1. In the stowed state, the first ribs R1 may contact the second connector C2, and a first gap G1 between any two adjacent first ribs R1 is occupied by the corresponding second rib R2. In addition, the second ribs R2 may contact the first connector C1, and a second gap G2 between any two adjacent second ribs R2 is occupied by the corresponding first rib R1.

FIG. 2 schematically illustrates the unfolded state of the display 1. In the unfolded state, the first ribs R1 are separated from the second connector C2, and a part of the first gap G1 between any two adjacent first ribs R1 is not occupied by the corresponding second rib R2. In addition, the second ribs R2 are separated from the first connector C1, and a part of the second gap G2 between any two adjacent second ribs R2 is not occupied by the corresponding first rib R1.

Please refer to FIG. 3 and FIG. 4. The flexible display module 12 is disposed on the display size adjustment module 10 and is bent to a back side BS of the display size adjustment module 10 for storage purposes. The flexible display module 12 is configured to display an image. For example, the flexible display module 12 may be a self-luminous display module or a non-self-luminous display module. The self-luminous display module may include an organic light-emitting diode display module, but not limited thereto. The non-self-luminous display module may include a reflective display module, such as an electrophoretic display module, but not limited thereto.

The flexible display module 12 may include a flexible display panel 120 and a flexible support member 122 supporting the flexible display panel 120, but not limited thereto. According to different requirements, the flexible display module 12 may also include other elements or film layers. For example, as shown in FIG. 4, the flexible display module 12 may also include a cover plate 124 and a functional layer 126, wherein the flexible display panel 120, the functional layer 126, and the cover plate 124 are, for example, sequentially disposed on the flexible support member 122.

Figure 11:
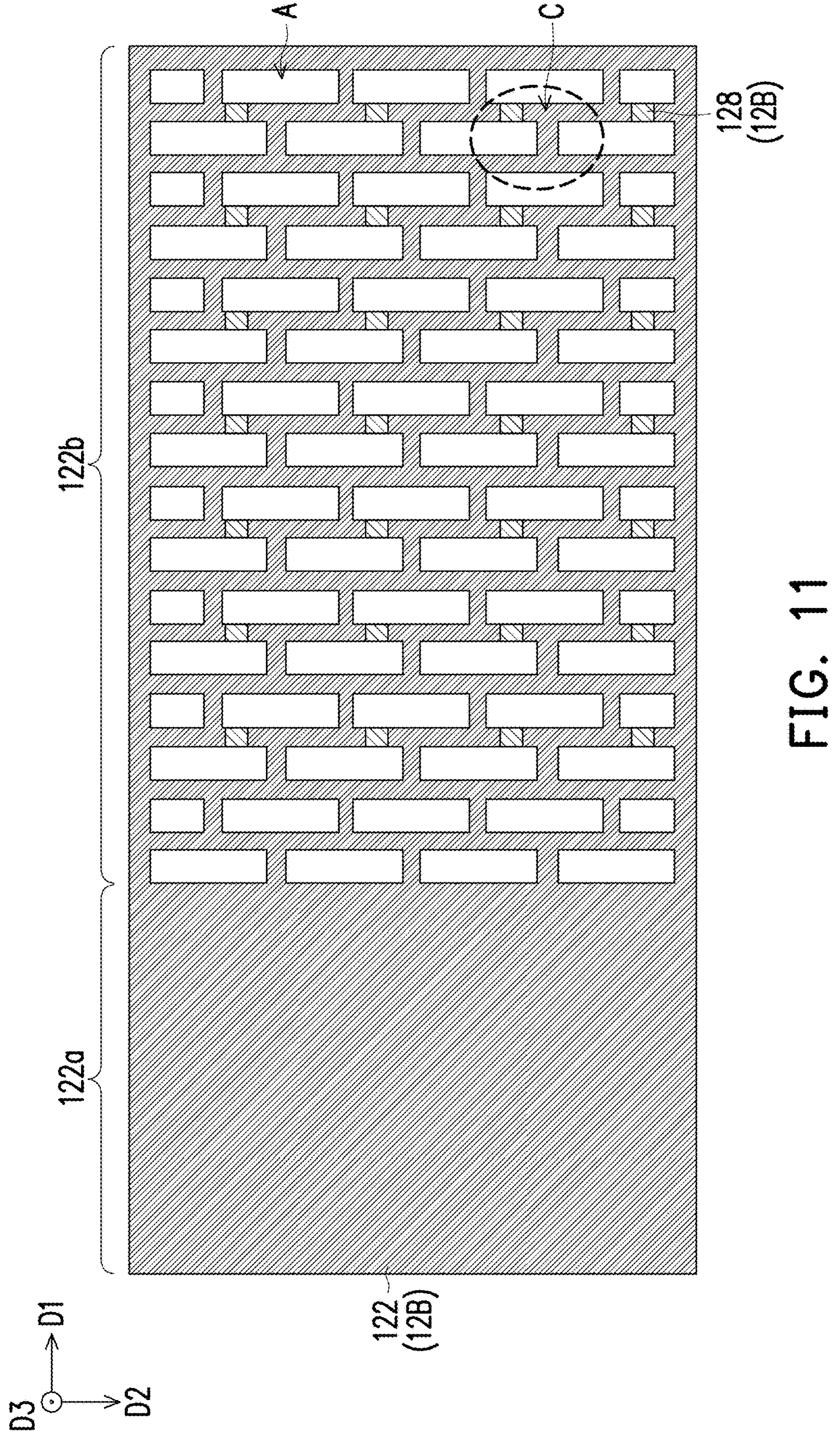
FIG. 11 is a partial top schematic view of a flexible support member of a display according to a third embodiment of the disclosure.

The material of the flexible support member 122 may include metal to provide support, flexibility, and/or heat dissipation functions, but not limited thereto. In some embodiments, a part of the flexible support member 122 bent to the back side BS of the display size adjustment module 10 may include multiple openings (multiple openings A as shown in FIG. 11) to improve flexibility or bendability, but not limited thereto. In other embodiments, a thinner flexible support member 122 and/or a back protection layer (not shown) may be used, so that the flexible support member 122 does not necessarily need the openings.

The flexible display panel 120 is located between the flexible support member 122 and the functional layer 126. Although not shown, the flexible display panel 120 may include a display medium, a driving element, the back protection layer, etc., but not limited thereto. The display medium may include a micro-capsule electrophoretic array, a micro-cup electrophoretic array, or an organic light-emitting diode array, but not limited thereto. The driving element may include an active element array, a gate driver, a source driver, but not limited thereto. The material of the back protection layer may include an insulating material such as plastic, an organic insulating material, an inorganic insulating material, etc., but not limited thereto.

The functional layer 126 is located between the flexible display panel 120 and the cover plate 124. The functional layer 126 may include a touch layer, a front light layer, etc., but not limited thereto. The cover plate 124 is disposed on the functional layer 126. The material of the cover plate 124 may include a flexible substrate material, such as plastic, but not limited thereto.

According to different requirements, the display 1 may also include one or more elements or film layers. For example, as shown in FIG. 1 to FIG. 3, the display 1 may further include a wheel 14 to guide the flexible display module 12 to bend. The wheel 14 is disposed on a side of the second element 102 away from the first element 100, and the flexible display module 12 surrounds the wheel 14 and is bent to the back side BS of the display size adjustment module 10.

In some embodiments, the first ribs R1 and the second ribs R2 in the display size adjustment module 10 may contact the flexible support member 122 in the flexible display module 12 to support the flexible display module 12. In addition, according to different embodiments, the flexible support member 122 may be connected to the second element 102 in the display size adjustment module 10 through at least one of magnetic attraction, electrostatic attraction, or a buckle, so that the flexible display module 12 may be flatly attached to the second element 102.

FIG. 5 and FIG. 6 schematically illustrate an implementation in which the flexible support member is connected to the second element 102 through magnetic attraction. Please refer to FIG. 5 and FIG. 6. Multiple side walls (for example, side walls SW2 parallel to a reference plane formed by the first direction D1 and the third direction D3) of the second ribs R2 may include multiple second grooves GV2, and the second element 102 also includes multiple second pop-up mechanisms PU2 embedded in the second grooves GV2.

In some embodiments, the second element 102 may also include multiple second rotating shafts RA2. The second pop-up mechanisms PU2 are respectively disposed corresponding to the second rotating shafts RA2 and may be fixed in the second grooves GV2 through the second rotating shafts RA2. In addition, the second pop-up mechanism PU2 may rotate with the second rotating shaft RA2 as the pivot.

During the process of the second element 102 sliding away from the first element 100, as shown in FIG. 6, the second grooves GV2 are exposed by the first ribs R1 (that is, the second grooves GV2 are no longer blocked by the first ribs R1), so that the second pop-up mechanisms PU2 may eject from the second grooves GV2. On the other hand, during the process of the second element 102 sliding toward the first element 100, as shown in FIG. 5, the second pop-up mechanisms PU2 are squeezed by the first ribs R1 and return to the second grooves GV2. In some embodiments, viewing from a top view, the ends of the first ribs R1 facing the second element 102 may be pointed to facilitate pushing the ejected second pop-up mechanism PU2 back to the second groove GV2.

In some embodiments, the second pop-up mechanisms PU2 may be magnetic, and the material of the flexible support member 122 (refer to FIG. 4) may include a paramagnetic material or a ferromagnetic material. In this way, an attractive force may be generated between the second pop-up mechanisms PU2 and the flexible support member 122, so that the flexible display module 12 may be flatly attached to the display size adjustment module 10 when the display 1 is in the unfolded state, and there is no need to use an extreme pulling force to flatten the panel, thereby helping to extend the service life of the display 1 and/or reduce the difficulty of mechanism design. The paramagnetic material may include aluminum, oxygen, titanium, and iron oxide (FeO), but not limited thereto. The ferromagnetic material may include a material such as iron, cobalt, nickel, and a compound and an alloy thereof, but not limited thereto.

In some embodiments, two adjacent second pop-up mechanisms PU2 corresponding to the same second rib R2 (such as the two adjacent second pop-up mechanisms PU2 located at the two opposite side walls SW2 of the same second rib R2) may be disposed in a magnetically homogeneous manner (such as N pole to N pole or S pole to S pole, and "N" represents N pole and "S" represents S pole in the drawings), so that the two adjacent second pop-up mechanisms PU2 corresponding to the same second rib R2 repel each other. Therefore, in a case where the second grooves GV2 are exposed by the first ribs R1 (as shown in FIG. 6), the two adjacent second pop-up mechanisms PU2 corresponding to the same second rib R2 may automatically eject from the two second grooves GV2.

On the other hand, the two adjacent second pop-up mechanisms PU2 corresponding to the two adjacent second ribs R2 may be disposed in a magnetically heterogeneous manner (such as N pole to S pole), so that the two adjacent second pop-up mechanisms PU2 corresponding to the two adjacent second ribs R2 attract each other after ejecting from the two second grooves GV2, which helps to improve the stability of the second ribs R2 located outside the second grooves GV2.

When the display 1 is in the unfolded state, the second pop-up mechanisms PU2 ejected from the second grooves GV2 not only help to flatten the flexible display module 12, but also may fill the second gap G2 between the second ribs R2. In this way, a user is less likely to notice a hole (the second gap G2) located below the flexible display module 12 when performing a touch operation (such as when pressing the flexible display module 12 using a finger or a stylus).

In some embodiments, multiple side walls SW1 of the first ribs R1 may include multiple first grooves GV1, and the first element 100 may further include multiple first pop-up mechanisms PU1 embedded in the first grooves GV1.

In some embodiments, the first element 100 further includes multiple first rotating shafts RA1. The first pop-up mechanisms PU1 are respectively disposed corresponding to the first rotating shafts RA1 and may be fixed in the first grooves GV1 through the first rotating shafts RA1. In addition, the first pop-up mechanism PU1 may rotate with the first rotating shaft RA1 as the pivot.

During the process of the second element 102 sliding away from the first element 100, as shown in FIG. 6, the first grooves GV1 are exposed by the second ribs R2 (that is, the first grooves GV1 are no longer blocked by the second ribs R2), so that the first pop-up mechanisms PU1 may eject from the first groove GV1. On the other hand, when the second element 102 slides toward the first element 100, as shown in FIG. 5, the first pop-up mechanisms PU1 are squeezed by the second ribs R2 and return to the first grooves GV1. In some embodiments, viewing from a top view, the ends of the second ribs R2 facing the first element 100 may be pointed to facilitate pushing the ejected first pop-up mechanism PU1 back to the first groove GV1.

The first pop-up mechanisms PU1 may or may not be magnetic. When the first pop-up mechanisms PU1 are magnetic, for the magnetic design thereof, reference may be made to the relevant description of the second pop-up mechanisms PU2, which will not be described again here.

When the display 1 is in the unfolded state, the first pop-up mechanisms PU1 ejected from the first grooves GV1 may fill the first gap G1 between the first ribs R1. In this way, the user is less likely to notice a hole (the first gap G1) below the flexible display module 12 when performing the touch operation.

Figure 7:
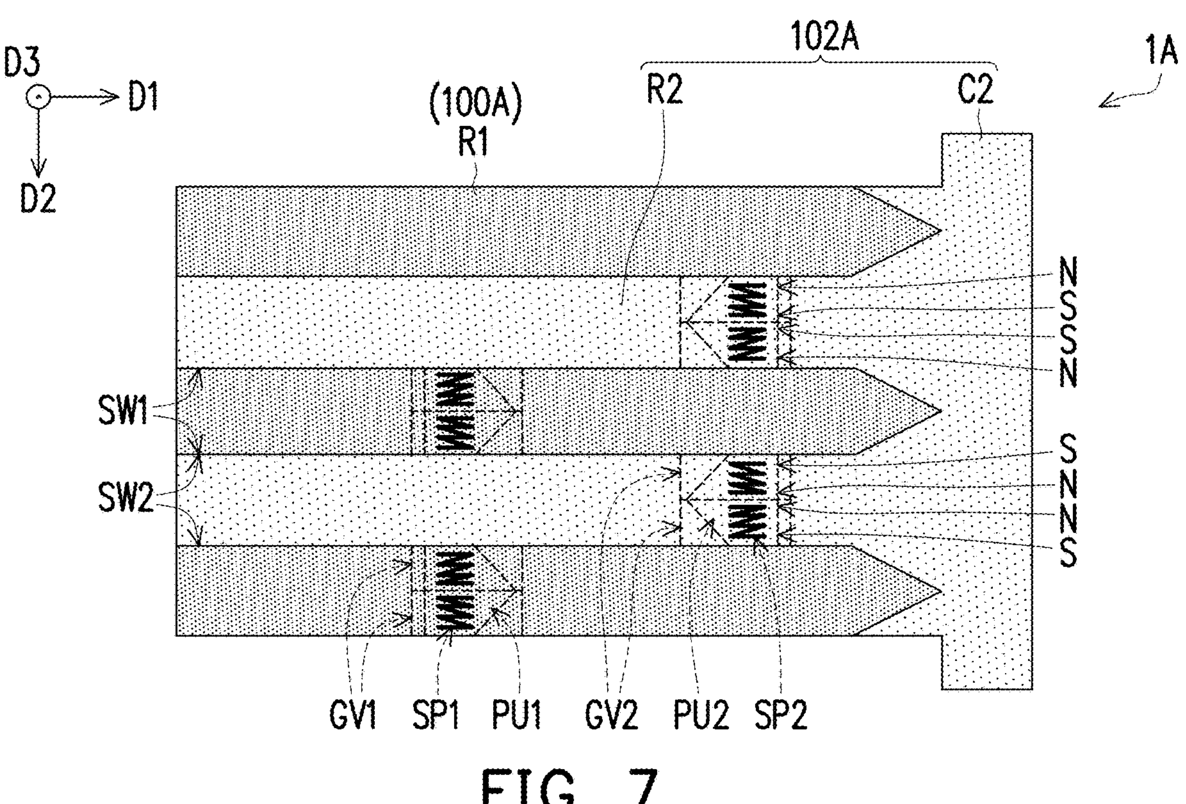
FIG. 7 and FIG. 8 are respectively partial top schematic views of a display in a stowed state and an unfolded state according to a second embodiment of the disclosure.
Figure 8:
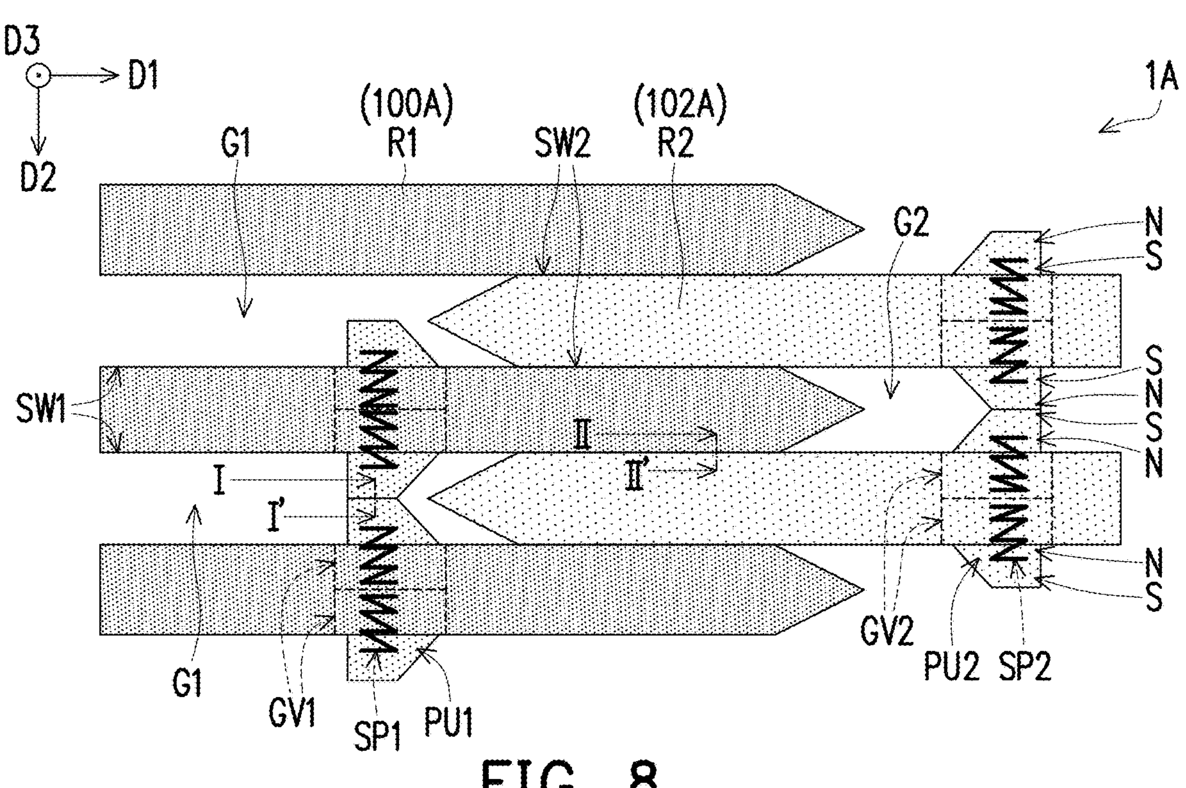
Figure 9:
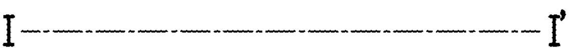
FIG. 9 and FIG. 10 are respectively cross-sectional schematic views corresponding to a sectional line I-I' and a sectional line II-II' in FIG. 8.
Figure 9:
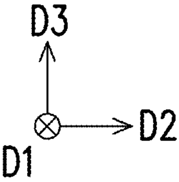
Figure 9:
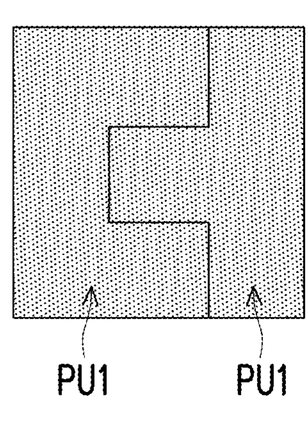
Figure 10:
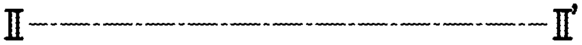
Figure 10:
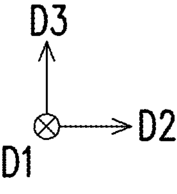
Figure 10:
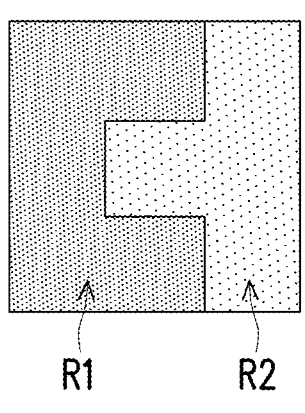

FIG. 7 and FIG. 8 are respectively partial top schematic views of a display in a stowed state and an unfolded state according to a second embodiment of the disclosure. FIG. 9 and FIG. 10 are respectively cross-sectional schematic views corresponding to a sectional line I-I' and a sectional line II-II' in FIG. 8. In FIG. 7 and FIG. 8, in order to clearly show the relative configuration relationship of multiple elements in a display size adjustment module located below a flexible display module, the flexible display module is omitted.

Please refer to FIG. 7 and FIG. 8. The main difference between a display 1A and the display 1 of FIG. 5 and FIG. 6 is described below. In the display 1A, the top view shapes of the first pop-up mechanisms PU1 and the second pop-up mechanisms PU2 are different from those shown in FIG. 5 and FIG. 6. In addition, in the display 1A, a second element 102A does not include the second rotating shafts RA2 in FIG. 5 and FIG. 6, and the second element 102A also includes multiple second springs SP2. The second pop-up mechanisms PU2 are respectively disposed corresponding to the second spring SP2 and may eject from the second grooves GV2 through the second springs SP2. In addition, in the display 1A, a first element 100A does not include the first rotating shafts RA1 in FIG. 5 and FIG. 6, and the first element 100A also includes multiple first springs SP1. The first pop-up mechanisms PU1 are respectively disposed corresponding to the first spring SP1 and may eject from the first grooves GV1 through the first springs SP1.

In some embodiments, two adjacent first pop-up mechanisms PU1 corresponding to two adjacent first ribs R1 may have an interlocking buckle design. As shown in FIG. 9, the two adjacent first pop-up mechanisms PU1 may respectively include a female buckle and a male buckle with complementary shapes, but not limited thereto.

In some embodiments, at least one of the first ribs R1 and an adjacent second rib R2 may also have an interlocking buckle design. As shown in FIG. 10, the adjacent first rib R1 and second rib R2 may respectively include a female buckle and a male buckle with complementary shapes, but not limited thereto.

It should be understood that the interlocking buckle design shown in FIG. 9 and FIG. 10 is only exemplary and is not intended to limit the disclosure. The interlocking buckle design described herein covers any conventional design suitable for the architecture of the disclosure.

In addition, although FIG. 5 to FIG. 8 schematically illustrate an implementation in which the flexible support member is connected to the second element through magnetic attraction, the disclosure not limited thereto. In other embodiments, although not shown, electrostatic attraction may be used instead of magnetic attraction to connect the flexible support member to the display size adjustment module. For example, the materials of the flexible support member and the second element may include conductive materials. Through enabling the flexible support member and the second element to have different electrical properties, the flexible display module may be flatly attached to the display size adjustment module when the display is in the unfolded state, and there is no need to use an extreme pulling force to flatten the panel, thereby helping to extend the service life of the display and/or reduce the difficulty of mechanism design.

Figure 12:
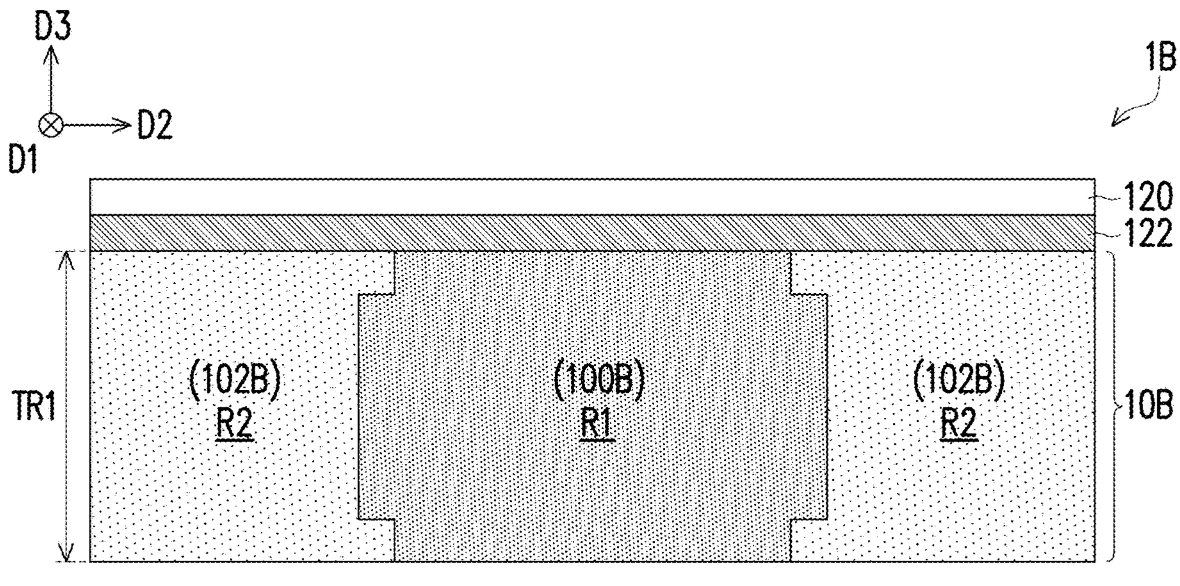
FIG. 12 and FIG. 13 are respectively partial cross-sectional schematic views of the display in a stowed state and an unfolded state according to the third embodiment of the disclosure.
Figure 13:
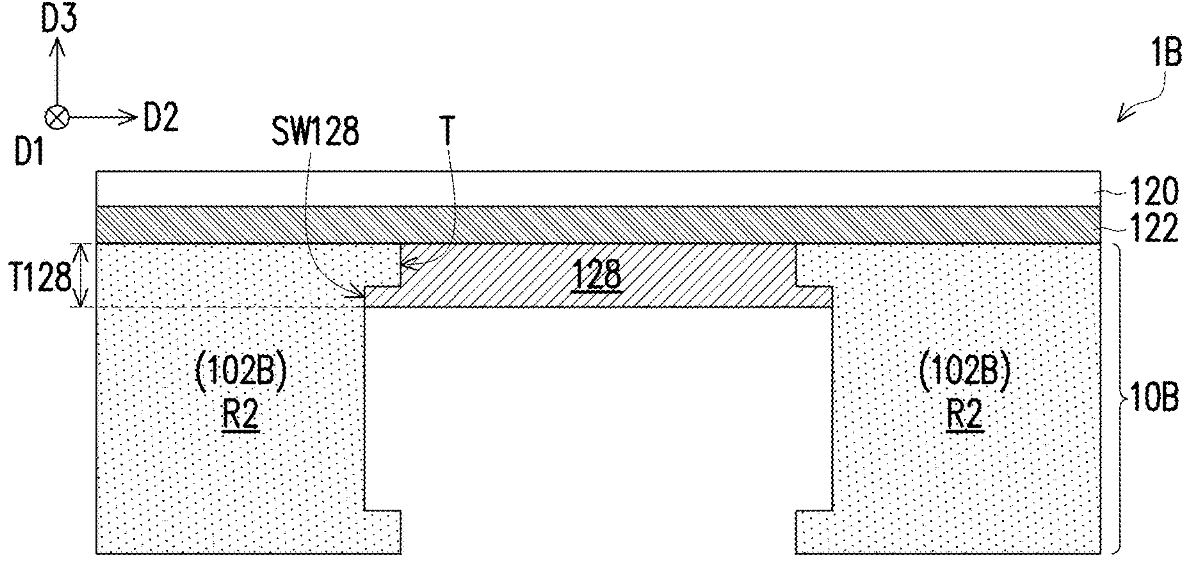

FIG. 11 is a partial top schematic view of a flexible support member of a display according to a third embodiment of the disclosure. FIG. 12 and FIG. 13 are respectively partial cross-sectional schematic views of the display in a stowed state and an unfolded state according to the third embodiment of the disclosure. For the sake of simplicity of the drawings, FIG. 12 and FIG. 13 omit the illustration of film layers (such as the cover plate 124 and the functional layer 126 in FIG. 4) located on the flexible display panel 120.

Please refer to FIG. 11 to FIG. 13. The main difference between a display 1B and the above display (for example, the display 1 or the display 1A) is explained below. In the display 1B, the flexible support member 122 is connected to a second element 102B through a buckle 128 instead of being connected to the second element 102B through magnetic attraction or electrostatic attraction. Under such an architecture, the material of the flexible support member 122 may not include a paramagnetic material or a ferromagnetic material. In addition, a first element 100B may adopt a design similar to the first element 100 in FIG. 5 and FIG. 6 or may adopt a design similar to the first element 100A in FIG. 7 and FIG. 8. Alternatively, the first element 100B may omit the first grooves GV1, the first pop-up mechanisms PU1, the first rotating shafts RA1, etc. in FIG. 5 and FIG. 6 or omit the first grooves GV1, the first pop-up mechanisms PU1, the first springs SP1, etc. in FIG. 7 and FIG. 8. Similarly, the second element 102B may adopt a design similar to the second element 102 in FIG. 5 and FIG. 6 or may adopt a design similar to the second element 102A in FIG. 7 and FIG. 8. Alternatively, the second element 102B may omit the second grooves GV2, the second pop-up mechanisms PU2, the second rotating shafts RA2, etc. in FIG. 5 and FIG. 6 or omit the second grooves GV2, the second pop-up mechanisms PU2, the second springs SP2, etc. in FIG. 7 and FIG. 8.

In addition, the flexible display module 12B may also include multiple buckles 128. The buckles 128 are disposed on a surface of the flexible support member 122 facing a display size adjustment module 10B. During the process of the second element 102B sliding away from the first element 100B, as shown in FIG. 13, the second ribs R2 slide away from the first ribs R1 and are engaged with the buckles 128. In some embodiments, each first rib R1 and an adjacent second rib R2 may have an interlocking buckle design, and two adjacent second ribs R2 and the buckle 128 located between the two may have an interlocking buckle design. As shown in FIG. 13, a side wall SW128 of each of the buckles 128 may have a trench T, and the trench Tis buckled to an upper edge of an adjacent second rib 128. In some embodiments, as shown in FIG. 12 and FIG. 13, a thickness T128 of the buckle 128 may be less than a thickness TR1 of the first rib R1.

The material of the buckles 128 may include metal, plastic, or rubber, but not limited thereto. In some embodiments, the buckles 128 may be made together with the flexible support member 122, and the materials of the buckles 128 and the flexible support member 122 may be the same, but not limited thereto. In other embodiments, the materials of the buckles 128 and the flexible support member 122 may be different, and the buckles 128 may be formed on a surface of the flexible support member 122 facing the display size adjustment module 10B through pasting, welding, 3D printing, etc.

In some embodiments, the flexible support member 122 may include a rigid portion 122*a* and a sliding portion 122*b* connected to the rigid portion 122*a*, and the sliding portion 122*b* includes multiple openings A. When the display is in the unfolded state (refer to FIG. 2), the sliding portion 122*b* overlaps with the second element (including the second connector C2 and the second ribs R2), and the rigid portion 122*a* overlaps with a part of the first element not staggered with the second element (including the first connector C1 and a part of the first ribs R1 not staggered with the second ribs R2). Through forming the openings A on a part of the flexible support member 122 bent to the back side of the display size adjustment module 10B, the flexibility or the bendability of the flexible support member 122 can be improved.

In some embodiments, as shown in FIG. 11, the openings A may be staggered in the first direction D1 and aligned in the second direction D2 to form multiple H-shaped connecting portions (see the dotted box of FIG. 11). Under such an architecture, the buckles 128 may be disposed adjacent to multiple corners C of the H-shaped connecting portions to reduce the probability of deformation of the flexible support member 122.

Figure 14:
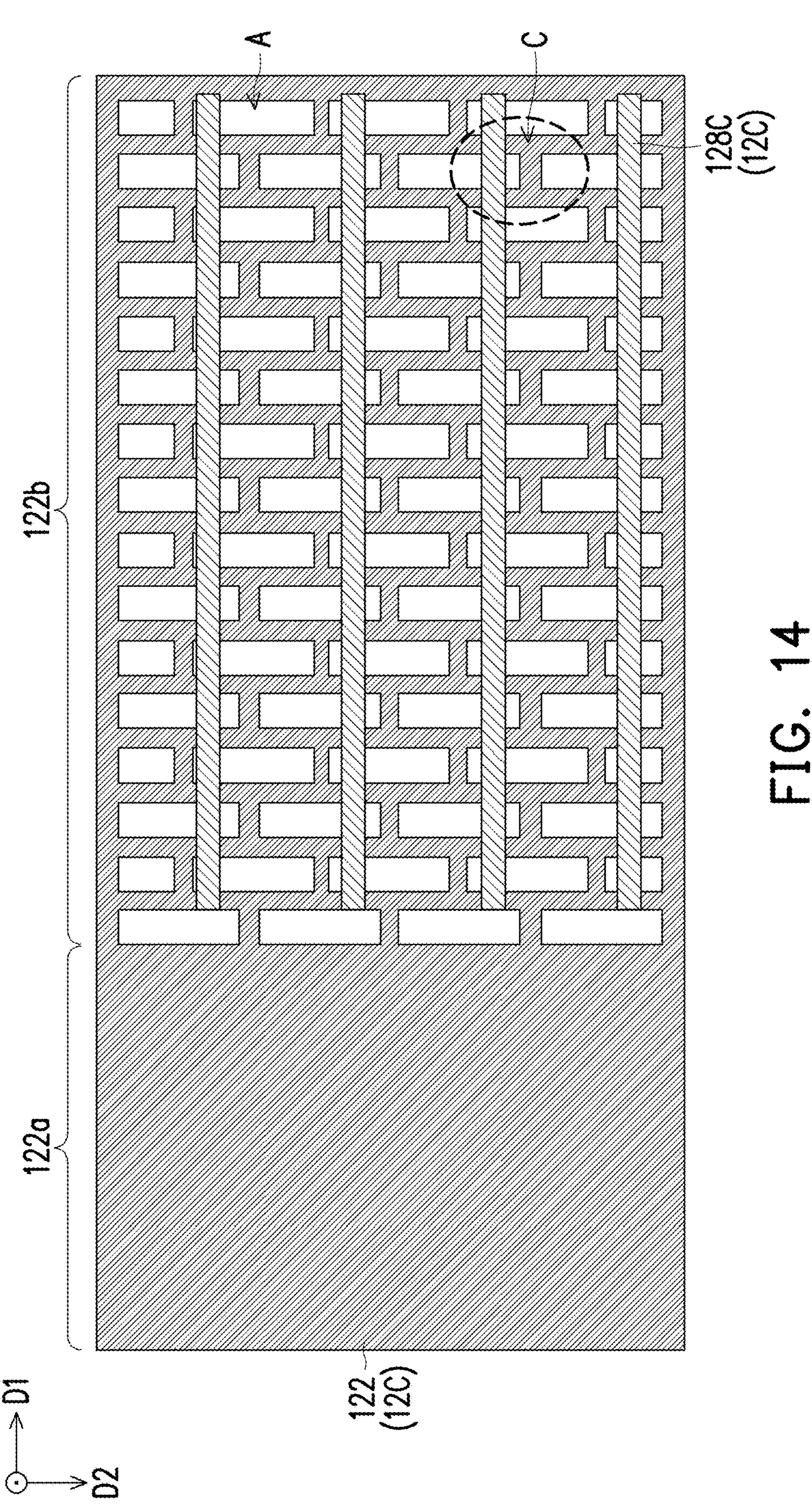
FIG. 14 is a partial bottom schematic view of a flexible support member of a display according to a fourth embodiment of the disclosure.
Figure 15:
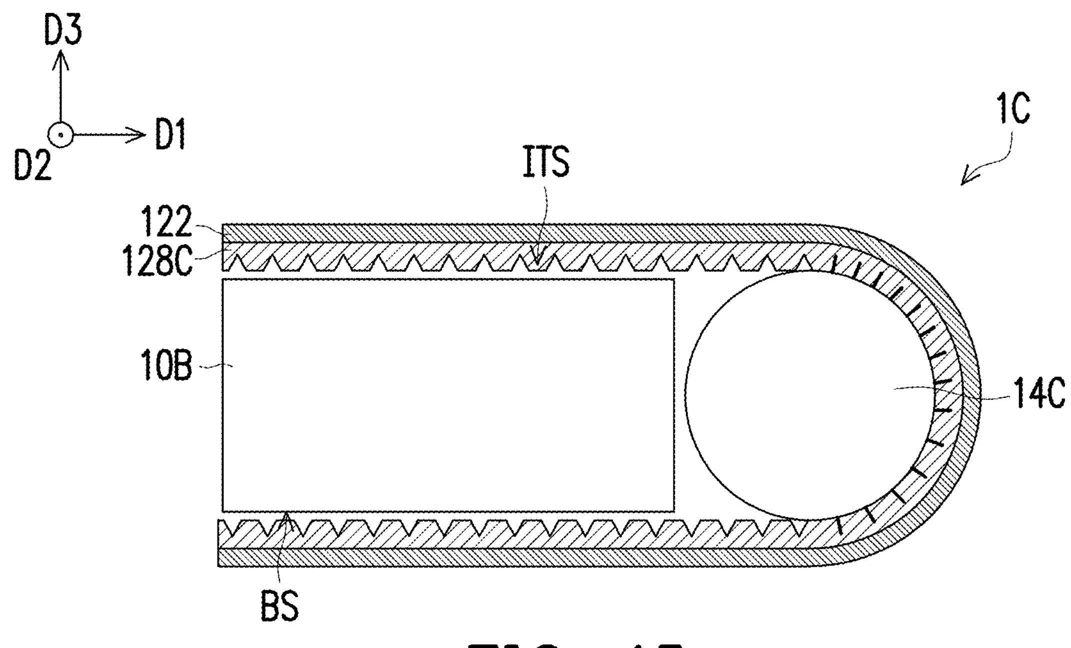
FIG. 15 is a partial cross-sectional schematic view of the display according to the fourth embodiment of the disclosure.
Figure 16:
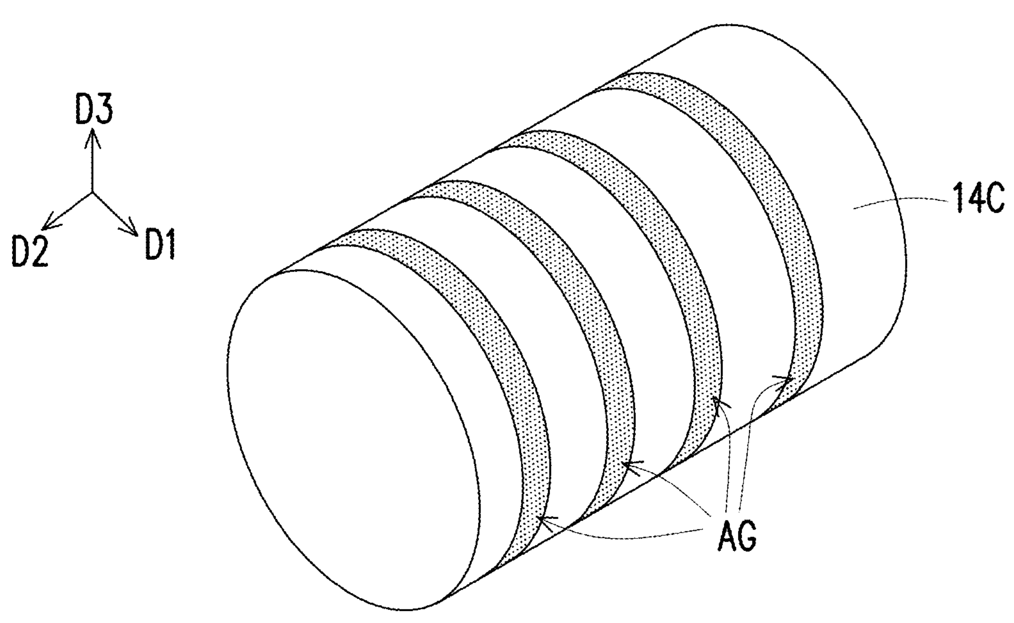
FIG. 16 is a three-dimensional schematic view of a wheel of the display according to the fourth embodiment of the disclosure.

FIG. 14 is a partial bottom schematic view of a flexible support member of a display according to a fourth embodiment of the disclosure. FIG. 15 is a partial cross-sectional schematic view of the display according to the fourth embodiment of the disclosure. FIG. 16 is a three-dimensional schematic view of a wheel of the display according to the fourth embodiment of the disclosure. For the sake of simplicity of the drawing, FIG. 15 omits the illustration of film layers (such as the flexible display panel 120, the cover plate 124, and the functional layer 126 in FIG. 4) located on the flexible support member 122.

Please refer to FIG. 14 to FIG. 16. The main difference between a display 1C and the display 1B of FIG. 11 to FIG. 13 is described below. In the display 1C, multiple buckles 128C are strip buckles extending along the first direction D1, and the buckles 128C are, for example, formed on the surface of the flexible support member 122 facing the display size adjustment module 10B through welding or pasting.

Forming the buckles 128C using pasting is beneficial to mass production. In addition, when a flexible display module 12C is bent on a wheel 14C, an adhesive between the buckles 128C and the flexible display module 12C may provide a buffer to reduce interference or wear between the buckles 128C and the flexible display module 12C.

In some embodiments, a surface of each of the buckles 128C facing the display size adjustment module 10B may have a repeating inverted trapezoid structure ITS, so that the buckles 128C are easy to bend at the wheel 14C. In addition, the wheel 14C may have multiple annular grooves AG corresponding to the buckles 128C, so that the flexible display module 12C is less likely to partially protrude on the wheel 14 due to the configuration of the buckles 128C.

Figure 17:
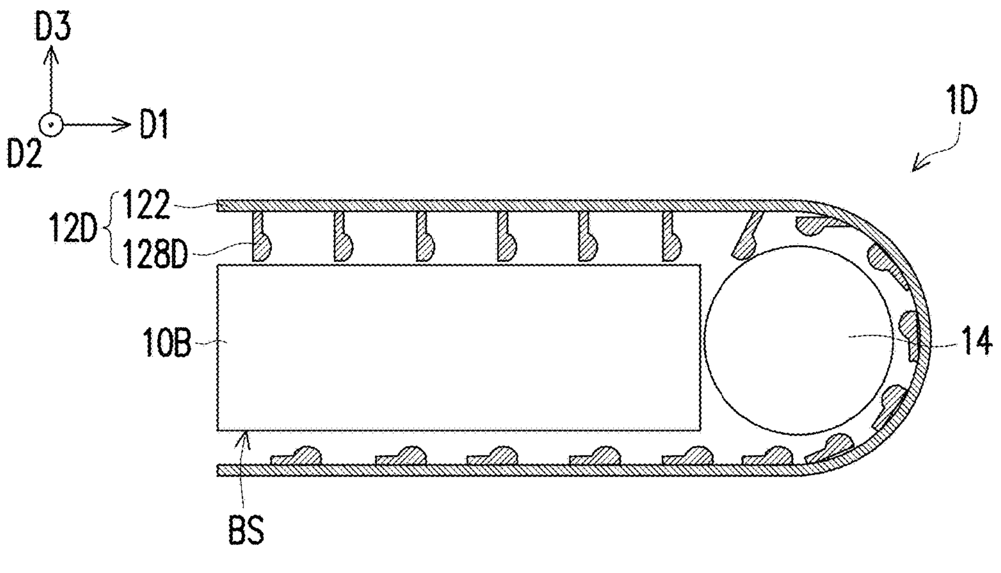
FIG. 17 is a partial cross-sectional schematic view of a display according to a fifth embodiment of the disclosure.
Figure 18:
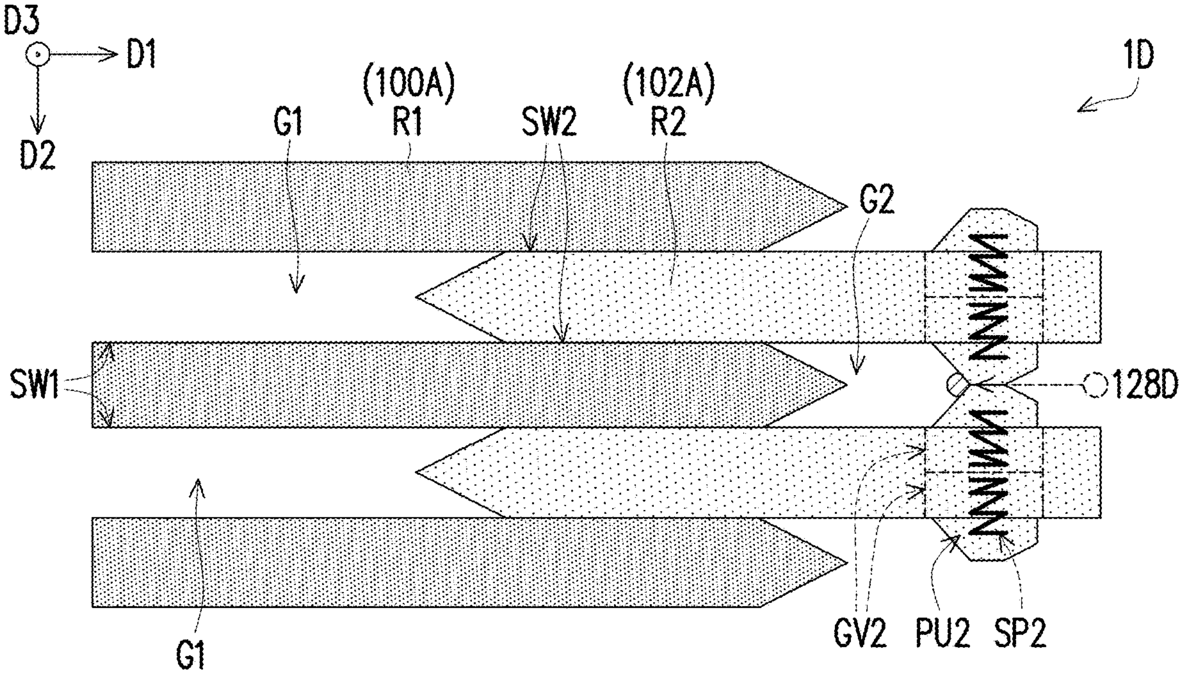
FIG. 18 and FIG. 19 are respectively a partial top schematic view and a partial cross-sectional schematic view of the display in an unfolded state according to the fifth embodiment of the disclosure.
Figure 19:
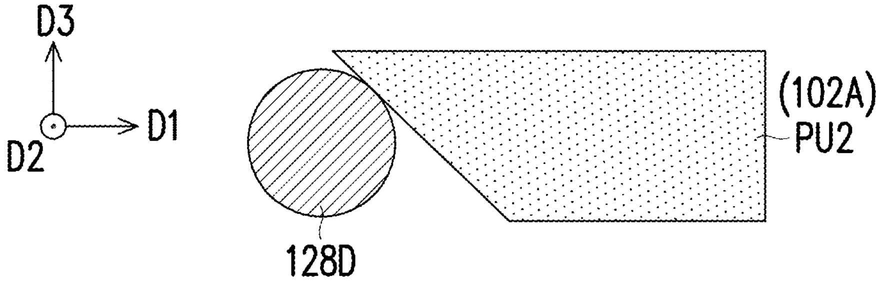

FIG. 17 is a partial cross-sectional schematic view of a display according to a fifth embodiment of the disclosure. FIG. 18 and FIG. 19 are respectively a partial top schematic view and a partial cross-sectional schematic view of the display in an unfolded state according to the fifth embodiment of the disclosure. For the sake of simplicity of the drawings, FIG. 17 omits the illustration of film layers (such as the flexible display panel 120, the cover plate 124, and the functional layer 126 in FIG. 4) located on the flexible support member 122. In addition, FIG. 18 omits the illustration of a flexible display module to clearly show the relative configuration relationship of multiple elements in a display size adjustment module located below the flexible display module. In addition, FIG. 19 only schematically illustrates a part of a hanging buckle and one second pop-up mechanism PU2.

Please refer to FIG. 17 to FIG. 19. The main difference between a display 1D, the display 1C of FIG. 14 to FIG. 16, and the display 1A of FIG. 7 and FIG. 8 is described below. In the display 1D, multiple buckles disposed on the surface of the flexible support member 122 facing the display size adjustment module 10B are multiple hanging buckles 128D. During the process of the second element 102A sliding away from the first element 100A, the second grooves GV2 are exposed by the first ribs R1, and the second pop-up mechanisms PU2 eject from the second grooves GV2 and form a buckled state with the hanging buckles 128D. As shown in FIG. 18 and FIG. 19, the hanging buckle 128D may pass through two adjacent ejected second pop-up mechanisms PU2 and abut under the two ejected second pop-up mechanisms PU2, so that the flexible display module 12D is flattened, and there is no need to use an extreme pulling force to flatten the panel. On the other hand, during the process of the second element 102A sliding toward the first element 100A, the second pop-up mechanisms PU2 are squeezed by the first ribs R1 and return to the second grooves GV2 (refer to FIG. 7). In addition, as the flexible display module 12D is bent to the back side BS of the display size adjustment module 10B, the hanging buckles 128D are flatly attached to the surface of the flexible support member 122 facing the display size adjustment module 10B, as shown in FIG. 17.

It should be understood that the shape of the second pop-up mechanism PU2 in FIG. 18 and FIG. 19 is only illustrative and may be changed according to actual requirements. In addition, the wheel 14 in FIG. 17 may be replaced with the wheel 14C in FIG. 16 or other types of wheels, which may not be limited here.

Figure 20:
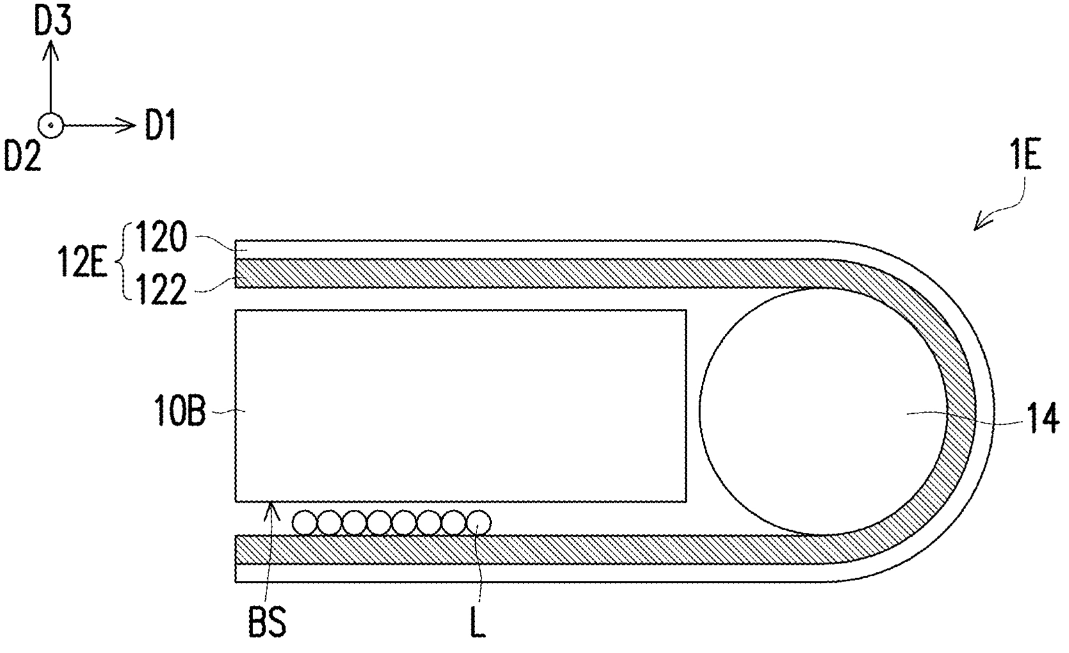
FIG. 20 is a partial cross-sectional schematic view of a display according to a sixth embodiment of the disclosure.
Figure 21:
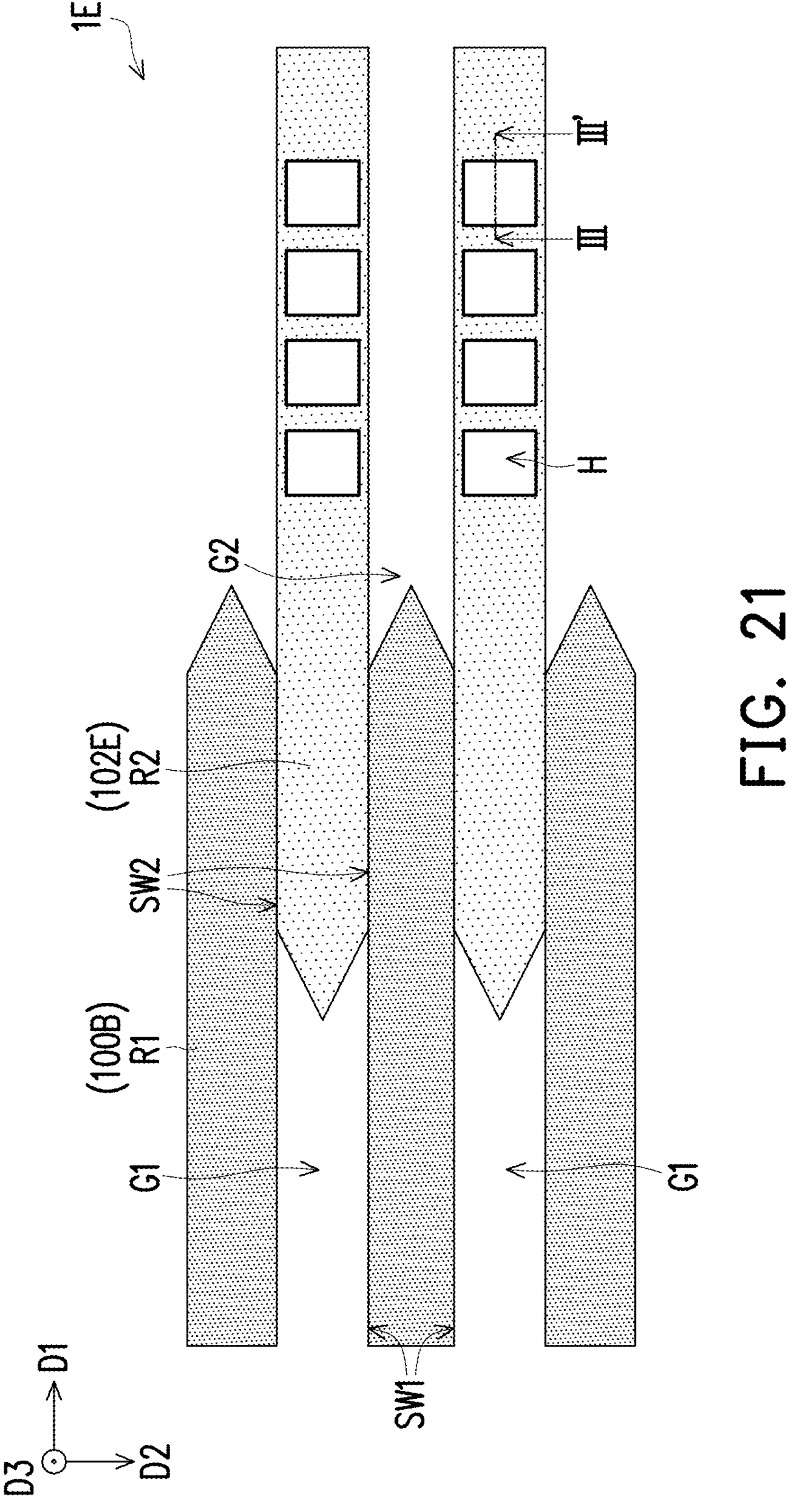
FIG. 21 is a partial top schematic view of the display in an unfolded state according to the sixth embodiment of the disclosure.
Figure 22:
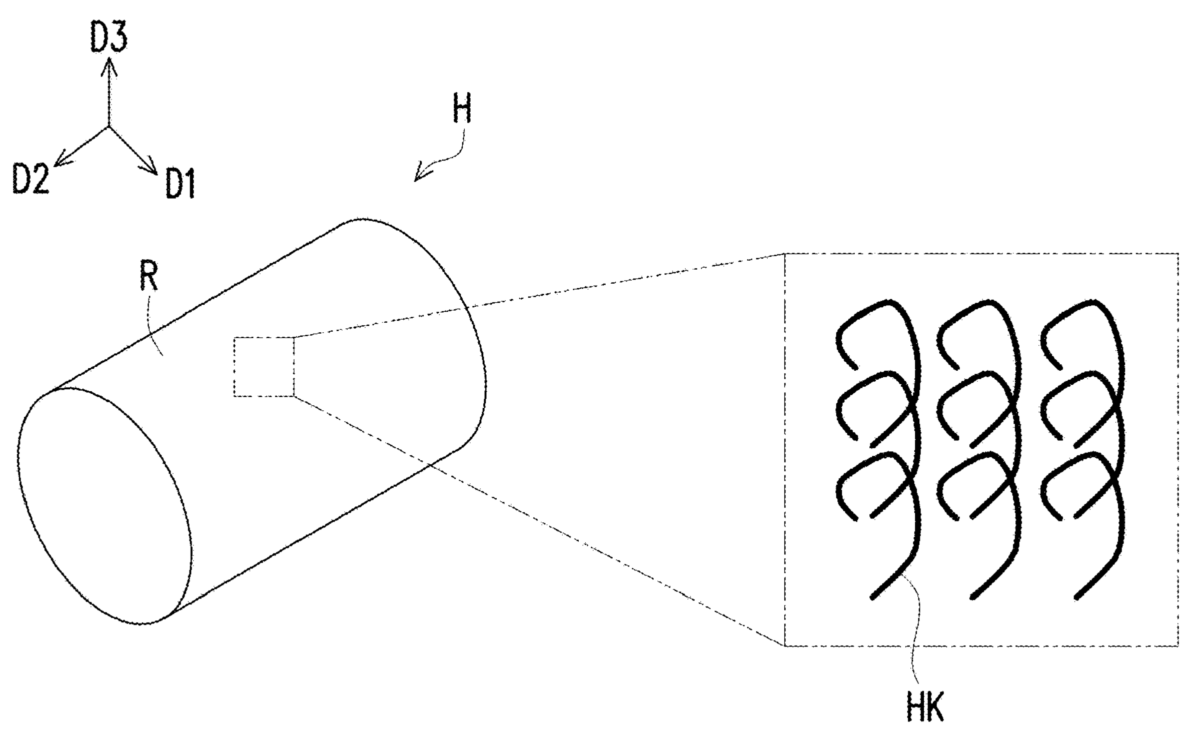
FIG. 22 is a three-dimensional schematic view of a hook buckle in FIG. 21.
Figure 23:
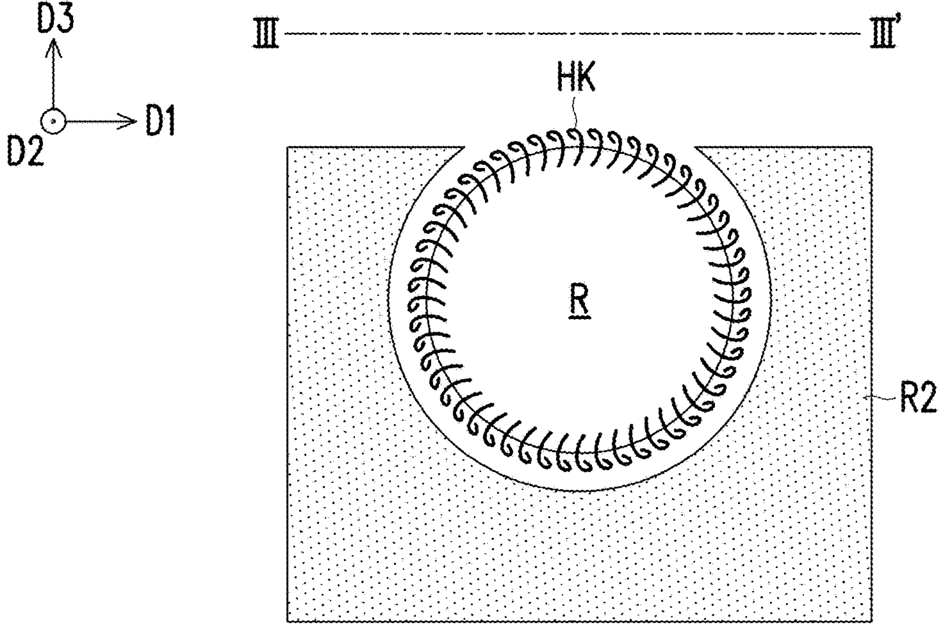
FIG. 23 is a cross-sectional schematic view corresponding to a sectional line III-III' in FIG. 21.

FIG. 20 is a partial cross-sectional schematic view of a display according to a sixth embodiment of the disclosure. FIG. 21 is a partial top schematic view of the display in an unfolded state according to the sixth embodiment of the disclosure. FIG. 22 is a three-dimensional schematic view of a hook buckle in FIG. 21. FIG. 23 is a cross-sectional schematic view corresponding to a sectional line III-III' in FIG. 21. For the sake of simplicity of the drawings, FIG. 20 omits the illustration of film layers (such as the cover plate 124 and the functional layer 126 in FIG. 4) located on the flexible display panel 120. In addition, FIG. 21 omits the illustration of a flexible display module to clearly show the relative configuration relationship of multiple elements in a display size adjustment module located below the flexible display module.

Please refer to FIG. 20 and FIG. 21. The main difference between a display 1E and the display 1D of FIG. 17 to FIG. 19 is described below. In the display 1E, multiple buckles disposed on the surface of the flexible support member 122 facing the display size adjustment module 10B are multiple loop buckles L, and the loop buckles L are adjacent to an end of the flexible support member 122 away from the first element 100B. In addition, a second element 102E also includes multiple hook buckles H. The hook buckles H are embedded in the second ribs R2 and are adjacent to multiple ends of the second ribs R2 away from the first element 100B. During the process of the second element 102E sliding away from the first element 100B, the hook buckles H form a buckled state with the loop buckles L. Through the buckled state formed by the hook buckles H and the loop buckles L, a force to resist the separation of the flexible support member 122 and the display size adjustment module 10B may be provided in the third direction D3, so that a flexible display module 12E is flattened, and there is no need to use an extreme pulling force to flatten the panel. For example, the loop buckle L may be a loop buckle end in a hook-and-loop fastener, and the hook buckle H may be a hook buckle end in the hook-and-loop fastener.

In some embodiments, as shown in FIG. 22 and FIG. 23, each of the hook buckles H may have a roller R and multiple hooks HK located on the roller R. During the process of the second element 102E sliding away from the first element 100B (refer to FIG. 21), the roller R, for example, rotates counterclockwise, and during the process of the second element 102E sliding toward the first element 100B, the roller R, for example, rotates clockwise.

The roller design of the hook buckles H helps to separate the hook buckles H and the loop buckles L from each other during the process of the second element 102E moving relative to the first element 100B.

In summary, in the embodiments of the disclosure, the flexible support member may be connected to the second element through at least one of magnetic attraction, electrostatic attraction, or a buckle, so that the flexible display module may be flatly attached to the display size adjustment module when the display is in the unfolded state, and there is no need to use an extreme pulling force to flatten the panel, thereby helping to extend the service life of the display and/or reduce the difficulty of mechanism design.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A display, comprising:

a display size adjustment module, comprising:

a first element, comprising a plurality of first ribs arranged at intervals; and a second element, comprising a plurality of second ribs arranged at intervals and slidably engaged with the first ribs, wherein a size of the display increases as the second element slides away from the first element and decreases as the second element slides toward the first element; and a flexible display module, disposed on the display size adjustment module and bent to a back side of the display size adjustment module, wherein the flexible display module comprises a flexible display panel and a flexible support member supporting the flexible display panel, and the flexible support member is connected to the second element through at least one of magnetic attraction, electrostatic attraction, or a buckle, wherein a plurality of side walls of the second ribs comprise a plurality of second grooves, the second element also comprises a plurality of second pop-up mechanisms embedded in the second grooves, during a process of the second element sliding away from the first element, the second grooves are exposed by the first ribs, and the second pop-up mechanisms eject from the second grooves, and during a process of the second element sliding toward the first element, the second pop-up mechanisms are squeezed by the first ribs and return to the second grooves.

2. The display according to claim 1, wherein:

the second pop-up mechanisms are magnetic, and a material of the flexible support member comprises a paramagnetic material or a ferromagnetic material.

3. The display according to claim 2, wherein two adjacent second pop-up mechanisms corresponding to a same second rib are disposed in a magnetically homogeneous manner, and two adjacent second pop-up mechanisms corresponding to two adjacent second ribs are disposed in a magnetically heterogeneous manner.

4. The display according to claim 2, wherein the second element further comprises a plurality of second rotating shafts, and the second pop-up mechanisms are respectively disposed corresponding to the second rotating shafts and are fixed in the second grooves through the second rotating shafts.

5. The display according to claim 1, wherein materials of the flexible support member and the second element comprise conductive materials.

6. A display, comprising:

a display size adjustment module, comprising:

a first element, comprising a plurality of first ribs arranged at intervals; and a second element, comprising a plurality of second ribs arranged at intervals and slidably engaged with the first ribs, wherein a size of the display increases as the second element slides away from the first element and decreases as the second element slides toward the first element; and a flexible display module, disposed on the display size adjustment module and bent to a back side of the display size adjustment module, wherein the flexible display module comprises a flexible display panel and a flexible support member supporting the flexible display panel, and the flexible support member is connected to the second element through at least one of magnetic attraction, electrostatic attraction, or a buckle, a plurality of side walls of the first ribs comprise a plurality of first grooves, and the first element comprises a plurality of first pop-up mechanisms embedded in the first grooves, during a process of the second element sliding away from the first element, the first grooves are exposed by the second ribs, and the first pop-up mechanisms eject from the first grooves, during a process of the second element sliding toward the first element, the first pop-up mechanisms are squeezed by the second ribs and return to the first grooves.

7. The display according to claim 6, wherein the first element also comprises a plurality of first rotating shafts, and the first pop-up mechanisms are respectively disposed corresponding to the first rotating shafts and are fixed in the first grooves through the first rotating shafts.

* * * * *